Aug. 12, 1924.
W. J. SHACKELTON
TRANSMISSION CIRCUITS
Filed Dec. 17, 1921
1,504,276
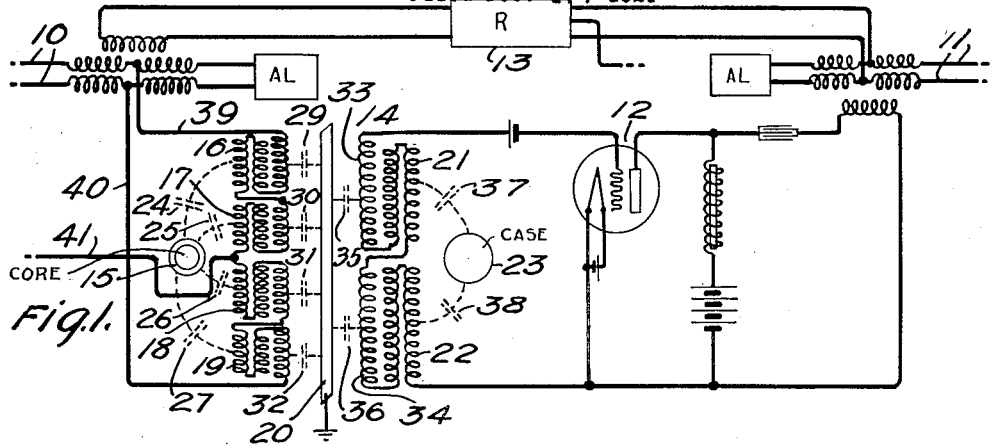
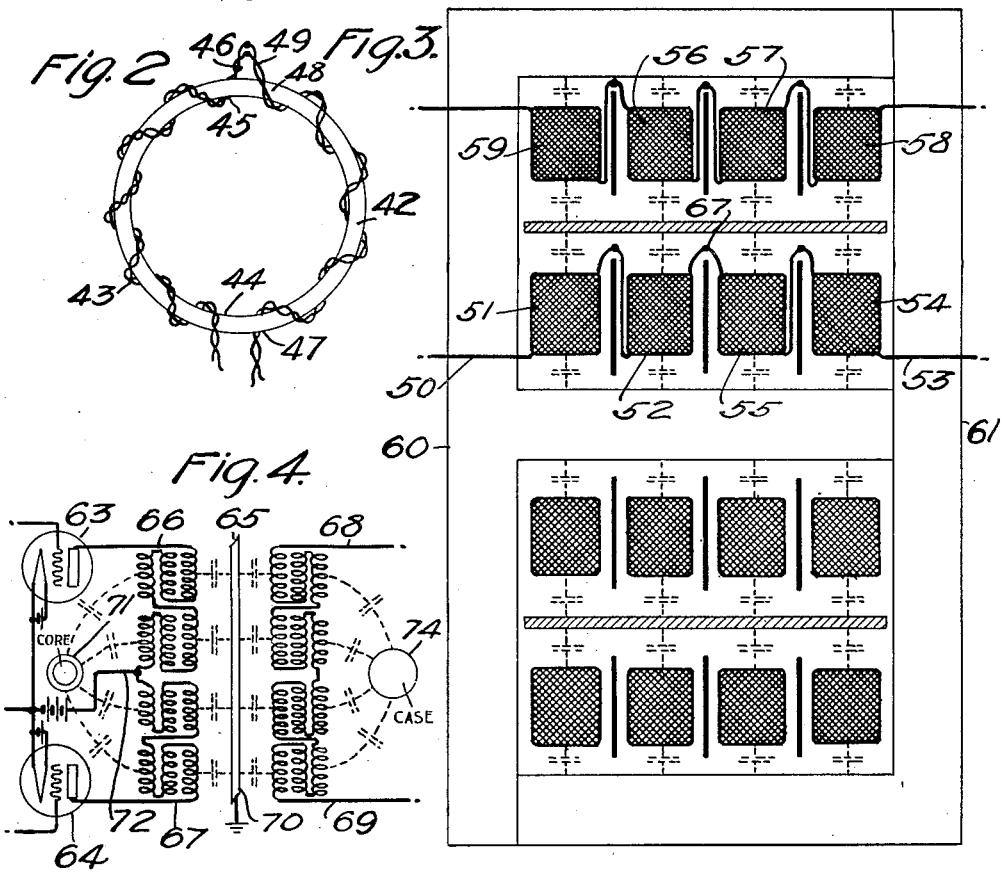
Inventor
William J. Shackelton,
by C. C. Sprague  Att'y Patented Aug. 12, 1924.

1,504,276

UNITED STATES PATENT OFFICE.

WILLIAM J. SHACKELTON, OF SCOTCH PLAINS, NEW JERSEY, ASSIGNOR TO WESTERN ELECTRIC COMPANY, INCORPORATED, OF NEW YORK, N. Y., A CORPORATION OF NEW YORK.

TRANSMISSION CIRCUITS.

Application filed December 17, 1921. Serial No. 522,985.

*To all whom it may concern:*

Be it known that I, WILLIAM J. SHACKELTON, a citizen of the United States, residing at Scotch Plains, in the county of Union, State of New Jersey, have invented certain new and useful Improvements in Transmission Circuits, of which the following is a full, clear, concise, and exact description.

This invention relates to transmission circuits and more particularly relates to a winding arrangement for impedance devices, such as transformers, of such a character as to give them an electro-static balance in regard to the effective capacities between one or more windings and the core or casing.

For convenience this invention will be described in connection with a two-winding transformer having a shield between its windings, in which the windings are so disposed that the effective capacity between the inner winding and the core, the capacity between the shield and both windings, and the capacity between the outer winding and the casing may be symmetrically arranged with respect to the two sides of the line in which the transformer may be located. In case it is desired to employ a toroidal core, the inner winding, which may be the primary winding, should preferably be divided into an even number of sections, such as two sections, each wound on different parts of the core with the external connections to the two inner layers, the outer layers being connected together. The outer winding, which may be the secondary winding, should be similarly wound in an even number of sections on the two halves of the core, the two inner layers thereof being directly connected and the external connections being made to the two outer layers. This arrangement insures a symmetrical distribution of the capacity between the various elements of the transformer and therefore possesses marked advantages in a transmission circuit where high quality and a minimum of distortion of the signaling currents or cross-talk are desired.

In general it will be found preferable to insert a grounded shield between the two windings to prevent any small accidental unbalances in one circuit from affecting the other circuit. This is particularly true when only one of the windings is balanced while the other is left unbalanced.

This invention will be better understood by reference to the following detailed description, taken in connection with the accompanying drawing in which Fig. 1 represents this invention embodied in a two-way repeating system in which only the primary winding is balanced; Fig. 2 shows how the winding arrangement of this invention may be employed in a transformer having a toroidal core; Fig. 3 illustrates the invention in connection with a rectangular core; and Fig. 4 represents this invention in a signaling circuit in which both windings of the transformer are balanced.

Referring to Fig. 1, the two-way repeating system disclosed therein comprises two line sections 10 and 11 with which are associated a suitable amplifying repeater 12 for impressing on line section 11 amplified signals from line section 10 and a similar amplifying repeater shown schematically at point 13 for impressing on line section 10 amplified signals from line section 11 in a manner now well known in the art. As described below the primary winding of the input transformer 14 is balanced electrostatically so that there will be no danger of cross-talk taking place between phantom circuit currents and side circuit currents when the phantom tap is taken from the midpoint of the primary winding.

The input transformer 14, which is constructed according to the present invention to have its primary winding balanced, comprises a core structure 15 of any desired form, a multi-layer primary winding of a plurality of sections, the inner layers 16, 17, 18 and 19 of which are adjacent core 15, a grounded shield 20 surrounding the primary winding and a multi-layer secondary winding, the outer layers 21 and 22 of which are surrounded by a suitable inclosing structure or transformer casing 23. The capacity effects existing between the inner layers 16, 17, 18 and 19 of the primary winding and the core are represented by the dotted line capacity elements 24, 25, 26 and 27 respectively. The capacities existing between the corresponding outer layers of the primary winding and the grounded shield are represented by capacities 29, 30, 31 and 32. The capacities of the inner layers 33 and 34 of the secondary winding are represented by capacity elements 35 and 36. The capacities of the outer layers 21 and 22 of the secondary winding with respect to the inclosing structure or casing 23 are represented by the capacity elements 37 and 38. It is apparent from the drawing that the capacities of the primary winding are symmetrically situated with respect to the two input leads 39 and 40. The connection of capacity 24, for example, to lead 39 is symmetrical with the connection of capacity 27 to lead 40 and the connection of capacity 25 to lead 39 is symmetrical with the connection of capacity 26 to lead 40. Similarly, the connections of the pair of capacities 29 and 32 and the connections of the pair of capacities 30 and 31 are also symmetrical with respect to the input leads 39 and 40.

One of the advantages obtained by the symmetrical distribution of the capacity effects of the primary winding to the adjacent core and shield, is that the midpoint of the primary winding may be used for phantom circuit connections in case line sections 10 and 11 are phantomed with other line sections in the well known manner, without any danger of cross-talk taking place. It will be apparent from the drawing that the capacity effects of the primary winding are symmetrically distributed with respect to phantom tap 41. The two sides of the lines 39 and 40 are therefore also maintained balanced to ground for phantom currents which may be flowing in parallel therethrough.

In such an arrangement as that shown in Fig. 1 it will be generally undesirable or unnecessary to produce an electro-static balance of the secondary winding of the input transformer since the secondary winding of the transformer 14 is connected in a circuit having one side grounded due to the fact that the cathode of tube 12 is generally connected to ground through a path of low impedance. Capacities 35 to 38 are therefore not shown symmetrically arranged with respect to the two sides of the line, although they may be so arranged if desired.

Grounded shield 20 is located between the windings for the purpose of preventing the unbalanced condition of the secondary side of the transformer from affecting the desired balanced condition of the primary side. In the absence of the shield the capacities between the primary and secondary windings would be unsymmetrically arranged with respect to ground, a result which would not be desired.

In case it is desired to have core 15 toroidal in form, the winding arrangement, by means of which the objects of this invention are accomplished, will be better understood by reference to Fig. 2, which shows a toroidal core 42 which has a twisted pair wound on each half thereof in such directions as to be aiding. The winding of the twisted pair 43 may be started at the point 44 and ending at the point 45 in as many layers as is desired, the end of the outer layer being brought out to the point 46. Similarly the first layer of the other twisted pair is wound on the core starting at the point 47 and ending at the point 48, being wound in the same number of layers as the pair 43 and the terminals of its outer layer being brought out at 49. The twisted pair 43, for example, may comprise the sections of transformer 14 comprising layers 16 and 19 while the other twisted pair may comprise the sections of transformer 14 comprising layers 17 and 18. By winding the primary winding as a twisted pair, the two wires of which are connected in circuit on opposite sides of the phantom tap, capacities 24 and 27 will always be equal in value and capacity 25 will have the same value as capacity 26. After the primary winding has been inserted on core 42, shielding material, such as tin or copper foil, may be wrapped around the primary winding. The two sections of the secondary winding of transformer 14 may then be wound on the two halves of core 42 in any desired manner.

Fig. 3 illustrates the winding arrangement when it is desired to use a rectangular core which may comprise, for example, a plurality of F-shaped strips 60 associated with a plurality of L-shaped strips 61 of core material so arranged as to form a plurality of substantially closed magnetic circuits. The primary winding should be wound in an even number of sections. The input lead 50 is shown connected to the inner layer of section 51 while the outer layer of section 51 is connected to the inner layer of section 52. The other input lead 53 for the primary winding is connected to the inner layer of section 54, the outer layer of which is connected to the inner layer of section 55. The outer layers of sections 52 and 55 are connected together. The connections of the sections of the secondary winding are similar, the inner layers of sections 56 and 57 being connected together while the outer layer of section 57 is connected to the inner layer of section 58 and the outer layer of section 56 is connected to the inner layer of section 59. The symmetrical distribution of the capacities of both the primary and secondary windings resulting from this method of connection is apparent from the drawing. If a connection is desired to the midpoint of the primary winding it may be taken from the point 67.

Fig. 4 illustrates this invention in a balanced vacuum tube circuit in which it is desirable to have both the primary and secondary windings electrostatically balanced. Tubes 63 and 64 may be a push-pull repeater, balanced modulator, generator, high frequency detector or the like, the anodes of which are connected to the outside terminals of the primary winding of transformer 65 by leads 66 and 67. The secondary winding of the transformer is connected to a balanced two wire line 68, 69. If it is desired to employ a toroidal core in transformer 65 the primary winding may be wound in the same manner as described under Figs 1 and 2 in order to have the capacity effects to the grounded shield 70 and the core 71 symmetrical with respect to lead 72 which connects the center point of the primary winding to the cathodes of the tubes. Since the secondary winding is also included in a balanced circuit, it may be wound in the same manner as the primary winding in order to get a symmetrical distribution of the capacity effects to the casing 74 and the grounded shield. If it is desired to have a core for transformer 65 similar to the core used in Fig. 3, the winding arrangement of Fig. 3 may be employed to obtain the desired capacity distribution.

In general it will be preferable to ground the shield located between the windings in order to lead off to ground any longitudinal currents, which, in the absence of the shield, would be fed to the secondary winding by the capacity effects. The shields shown in Figs. 3 and 4 also prevent small accidental unbalances occurring in one side of the transformer from affecting the degree of balance of the other side of the transformer.

If desired, the transformer core and casing may also be grounded in addition to grounding the shield in between the windings, without disturbing the electro-static balance of the circuit.

It is obvious from the above description that this invention is of great utility in circuit arrangements widely different from those referred to above and it will furthermore be apparent to those skilled in the art that the winding arrangement shown in the drawings may be variously modified without departing in any wise from the spirit of this invention as described in the appended claims.

What is claimed is:

1. A transmission circuit comprising a transformer having a multi-layer primary winding, a multi-layer secondary winding, and a shield between said windings, each of said windings being in a plurality of sections, the inner layer of each section of one winding being symmetrically connected to the two sides of said circuit.

2. In combination, a two-wire line and a transformer, said transformer comprising a multi-layer winding, a second multi-layer winding, and a shield between said windings, each of said windings being wound in a plurality of sections, the outer layers of the sections of one winding being symmetrically connected to the two wires of said line.

3. In combination, a two-wire line and a transformer, said transformer comprising a core, a multi-layer primary winding and a multi-layer secondary winding, a shield between said windings, each winding being wound in a plurality of sections, the capacity between the inner layer of one section of one winding and the core and the capacity between the inner layer of another section of the same winding and the core being symmetrically located with respect to the two wires of said line.

4. In combination, a two-wire line and a transformer, said transformer comprising a core, a primary winding of a plurality of sections, a secondary winding, a shield between said windings, each of said sections comprising a plurality of layers on said core, the capacities between the shield and the adjacent layers of said sections being symmetrically situated with respect to the two wires of said line.

5. In combination, a two-wire line and a transformer, said transformer comprising a core, a transformer winding of a plurality of sections surrounding different portions of said core, a second transformer winding of a plurality of sections surrounding different portions of said core, each of said sections comprising a plurality of layers, a shield between said windings, the capacities between the core and the inner layers of the sections of said first winding, the capacities between the shield and the outer layers of the sections of the first winding, the capacities between the shield and the inner layers of the sections of the second winding, and the capacities between the casing and the outer layers of the sections of the second winding all being symmetrically situated with respect to the two wires of said line.

6. A transformer for a transmission line comprising a toroidal core, primary and secondary windings wound on said core, one winding having a twisted pair wound on one part of said core and a second twisted pair wound on a second part of said core in such direction as to be in series aiding relation, and a shield between said windings, the conductors of said pairs being connected together so that one terminal of a conductor of the first pair is adapted to be connected to one side of the line with its other terminal connected to a terminal of a conductor of the second pair, the remaining conductor of the first pair being connected between the above mentioned conductor of the second pair and the remaining conductor of the second pair, one terminal of said remaining conductor of the second pair being adapted to be connected to the other side of the line.

7. A transformer comprising a core, primary and secondary windings, a shield between said windings, one of said windings being arranged to have a capacity distribution to said core and shield which is symmetrical with respect to the midpoint of said one winding.

8. In combination a two-wire line, an amplifying repeater, of a transformer arrangement between said line and said repeater comprising a core, primary and secondary windings and a shield between said windings, said transformer having an electro-static balance with respect to the capacities between the core and the adjacent layers of one of the windings and between the shield and the adjacent layers of the other winding.

9. A transmission circuit comprising a transformer having a multi-layer primary winding, a multi-layer secondary winding, and a shield between said windings, one of said windings being in a plurality of sections the inner layers of two of said sections being symmetrically connected to the two sides of said circuit.

In witness whereof, I hereunto subscribe my name this 16th day of December, A. D., 1921.

WILLIAM J. SHACKELTON.